US009380234B1

(12) United States Patent
Chen et al.

(10) Patent No.: US 9,380,234 B1
(45) Date of Patent: Jun. 28, 2016

(54) REDUCED RANDOM TELEGRAPH SIGNAL NOISE CMOS IMAGE SENSOR AND ASSOCIATED METHOD

(71) Applicant: OmniVision Technologies, Inc., Santa Clara, CA (US)

(72) Inventors: Qingfei Chen, San Jose, CA (US); Qingwei Shan, San Jose, CA (US); Han Lei Lock, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/702,323

(22) Filed: May 1, 2015

(51) Int. Cl.
*H04N 5/335* (2011.01)
*H04N 5/363* (2011.01)
*H04N 5/374* (2011.01)
*H04N 5/378* (2011.01)
*H04N 5/357* (2011.01)

(52) U.S. Cl.
CPC ............ *H04N 5/363* (2013.01); *H04N 5/3575* (2013.01); *H04N 5/374* (2013.01); *H04N 5/378* (2013.01)

(58) Field of Classification Search
CPC .................................................... H04N 5/3658
USPC ......................................... 348/308, 294, 241
See application file for complete search history.

(56) References Cited

U.S. PATENT DOCUMENTS

| 7,554,584 | B2 | 6/2009 | Lim |
| 7,688,366 | B2 | 3/2010 | Beck |
| 7,995,124 | B2 | 8/2011 | Dai |
| 8,294,077 | B2 | 10/2012 | Mao et al. |
| 8,422,819 | B2 | 4/2013 | Ise |
| 8,513,102 | B2 | 8/2013 | Forbes et al. |
| 8,730,364 | B2 | 5/2014 | Dai et al. |
| 8,767,098 | B2 | 7/2014 | Solhusvik |
| 8,917,098 | B2 * | 12/2014 | Choe ...................... H04N 5/378 324/615 |
| 2011/0013855 | A1 * | 1/2011 | Ise ....................... H04N 5/3658 382/275 |

OTHER PUBLICATIONS

Bigas, et al., "Review of CMOS image sensors", Microelectronics Journal 37 (2006) 433-451.
Coath, et al., "A Low Noise Pixel Architecture for Scientific CMOS Monolithic Active Pixel Sensors", Nuclear Science, IEEE Transactions vol. 57, Issue 5, Jul. 19, 2010, 2 pages.
Findlater, et al., "SXGA Pinned Photodiode CMOS Image Sensor in 0.35μm Technology", 2003 IEEE International Solid-State Circuits Conference, Paper 12.4, Feb. 11, 2003, 10 pp.

(Continued)

*Primary Examiner* — Joel Fosselman
(74) *Attorney, Agent, or Firm* — Lathrop & Gage LLP

(57) ABSTRACT

A reduced random telegraph signal (RTS)-noise CMOS image sensor includes a pixel and a correlated double sampling (CDS) circuit electrically connected to the pixel. The CDS circuit is characterized by a CDS period that includes a reference sample period and an image data sample period. The image sensor also includes a bitline, a bitline connection switch between the pixel and a readout circuit connected to the pixel, and a bitline switch controller. The bitline transmits a transfer gate signal as a bitline signal having a non-zero value during a first time period entirely between the reference sample period and the image data sample period. The bitline switch controller is electrically connected to and configured to control the bitline connection switch such that the bitline connection switch is closed during the entire CDS period except for a single continuous open period that includes the first time period.

8 Claims, 5 Drawing Sheets

(56) References Cited

OTHER PUBLICATIONS

Findlater, et al., "Source follower noise limitations in CMOS active pixel sensors", Detectors and Associated Signal Processing. Proceedings of the SPIE, vol. 5251, pp. 187-195 (2004).

Han, et al., "Characteristics of random telegraph signal noise in time delay integration CMOS image sensor", Microelectronics Reliability 53 (2013) 400-404.

Köklü, et al., "A Switched Capacitor Fully Differential Correlated Double Sampling Circuit for CMOS Image Sensors", Proceedings of the 5th International Symposium on Medical Information and Communication Technology, 2011, pp. 113-116.

Leyris, et al., "Impact of Random Telegraph Signal in CMOS Image Sensors for Low-Light Levels", Solid-State Circuits Conference EESCIRC 2006, pp. 376-379.

Martin-Gonthier, et al., "Novel Readout Circuit Architecture for CMOS Image Sensors Minimizing RTS Noise", IEEE Electron Device Letters, vol. 32, Iss. 6, 2011, pp. 776-778.

Goiffon, et al., "New Source of Random Telegraph Signal in CMOS Image Sensors", RTS Paper R27, accessed from http://www.imagesensors.org/Past%20Workshops/2011%20Workshop/2011%20Papers/R27_Goiffon_RTS.pdf; 2011, 4 pp.

Wang, et al., "Random Telegraph Signal in CMOS Image Sensor Pixels", IEEE, IEDM '06, Electron Devices Meeting 2006, 4 pp.

\* cited by examiner

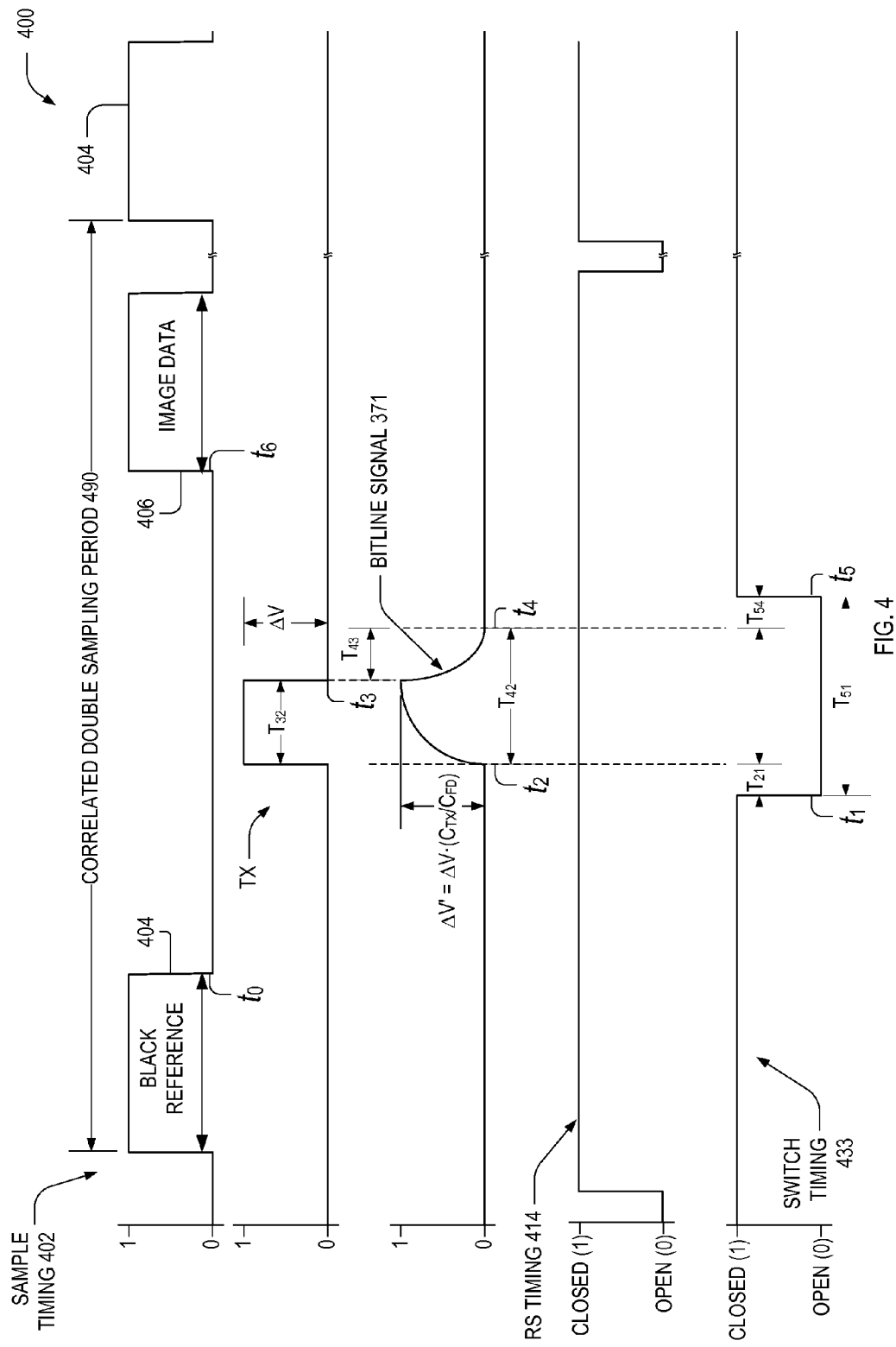

502 — OPENING, AT A FIRST INSTANT, A BITLINE CONNECTION SWITCH OF A BITLINE SELECTIVELY CONNECTING A PIXEL AND A READOUT CIRCUIT, THE FIRST INSTANT OCCURRING AFTER A CDS REFERENCE SAMPLE ENDS AND BEFORE A SECOND INSTANT WHEN A BITLINE SIGNAL SWITCHES ON.

504 — CLOSING, AT A FIFTH INSTANT, THE BITLINE CONNECTION SWITCH, THE FIFTH INSTANT OCCURRING AFTER A FOURTH INSTANT WHEN THE BITLINE SIGNAL ENDS AND BEFORE A SIXTH INSTANT WHEN A CDS IMAGING DATA SAMPLE BEGINS.

REDUCED RANDOM TELEGRAPH SIGNAL NOISE CMOS IMAGE SENSOR AND ASSOCIATED METHOD

BACKGROUND

Complementary metal-oxide semiconductor (CMOS) image sensors are ubiquitous in products that incorporate cameras, such as mobile devices, motor vehicles, medical devices, and video surveillance devices. A CMOS image sensor includes a pixel array of N×M columns and rows, respectively, wherein each pixel converts light imaged thereon by a camera lens into a digital signal that is converted into part of a displayed image and/or file containing image data.

Each pixel includes a photodiode, which is a source of photodiode reset noise that may introduce artifacts into the image data. A CMOS image sensor may include correlated double-sampling (CDS) circuits to decrease or eliminate such noise. A CDS circuit, as its name implies, samples the output from a pixel twice per sampling period: (i) a reference sample acquired after a reset transistor resets the photodiode voltage, and (ii) an image data sample acquired after a transfer gate is pulsed, which results in integrating signal charge accumulated in the photodiode. Reset noise in the image data sample is removed by subtracting the reference sample from the image data sample.

Absent significant photodiode reset noise, random telegraph signal (RTS) noise is a significant noise source. A source-follower transistor in each pixel is one source of RTS noise, which manifests in the digital signal representation as flickering display pixels in low-light conditions. A second source of RTS noise is column readout circuitry corresponding to each pixel column of the CMOS image sensor, referred to herein as column-wise RTS noise or biased RTS noise.

SUMMARY OF THE INVENTION

The embodiments disclosed herein demonstrate a CMOS image sensor with column-readout timing for reduced biased RTS noise.

A reduced random telegraph signal (RTS)-noise CMOS image sensor is disclosed. The image sensor includes a pixel and a correlated double sampling (CDS) circuit electrically connected to the pixel. The CDS circuit is characterized by a CDS period that includes a reference sample period and an image data sample period. The image sensor also includes a bitline, a bitline connection switch between the pixel and a readout circuit connected to the pixel, and a bitline switch controller. The bitline transmits a transfer gate signal as a bitline signal having a non-zero value during a first time period entirely between the reference sample period and the image data sample period. The bitline switch controller is electrically connected to and configured to control the bitline connection switch such that the bitline connection switch is closed during the entire CDS period except for a single continuous open period that includes the first time period.

A method for reducing RTS noise in a CMOS image sensor is also disclosed. The method includes opening, at a first instant, a bitline connection switch of a bitline selectively connecting a pixel and a readout circuit. The first instant occurs after a correlated double sampling (CDS) reference sample ends before a second instant when a bitline signal switches on. The method also includes closing, at a fifth instant, the bitline connection switch. The fifth instant occurs after a fourth instant when the bitline signal ends and before a sixth instant when a CDS imaging data sample begins.

BRIEF DESCRIPTION OF THE FIGURES

FIG. 4 is a timing diagram illustrating CDS operation of one column readout circuit of the reduced RTS-noise CMOS image sensor of FIG. 1, in an embodiment.

FIG. 5 is a flowchart illustrating a method for reducing RTS noise in a CMOS image sensor, in an embodiment.

DETAILED DESCRIPTION

Figure 1:
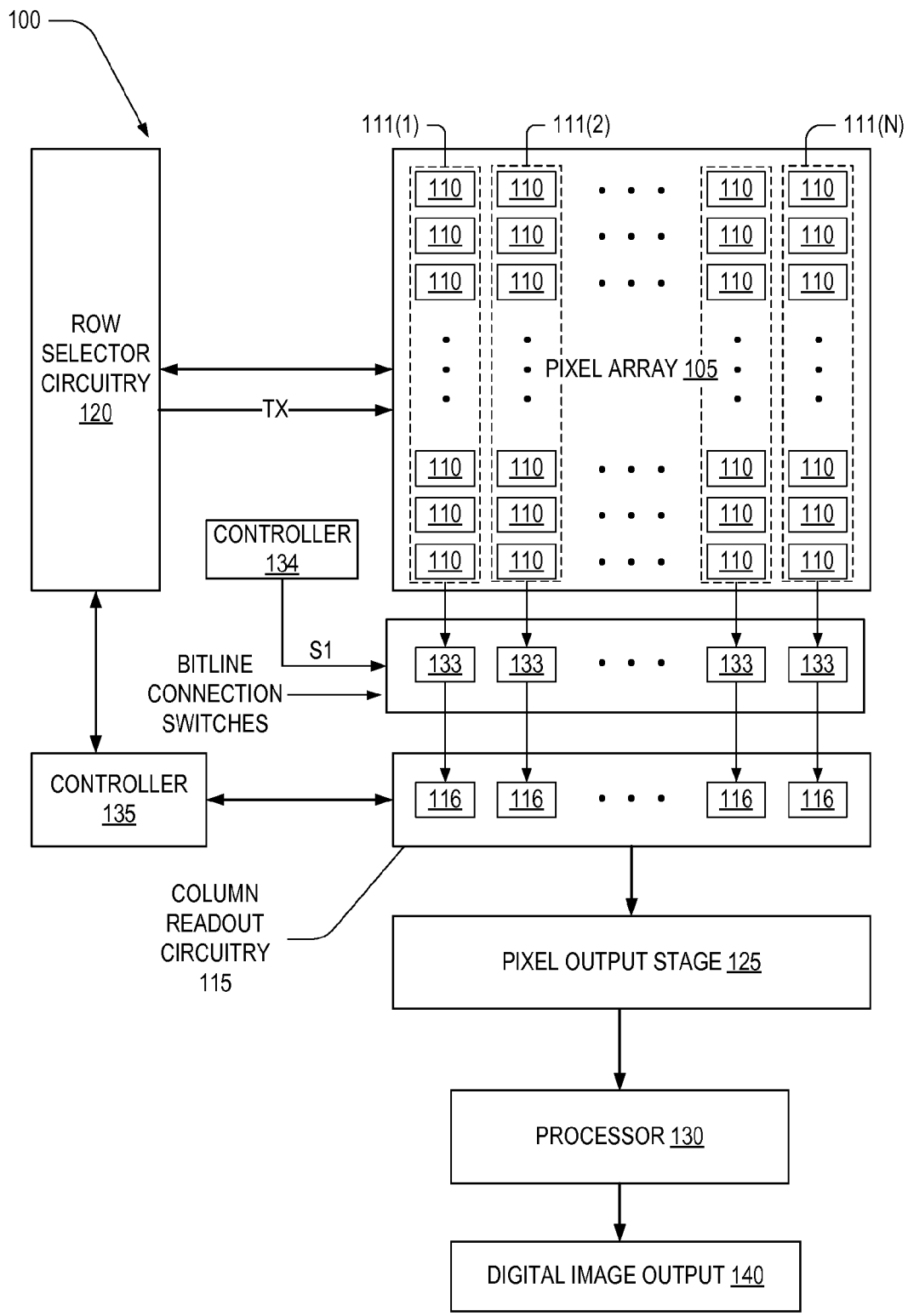
FIG. 1 illustrates a reduced RTS-noise CMOS image sensor, in an embodiment.

FIG. 1 illustrates a reduced RTS-noise CMOS image sensor 100 that includes a pixel array 105 having a plurality of pixels 110, each pixel being part of a pixel row and a pixel column 111. The CMOS image sensor 100 is operated by a controller 135, which controls the selection of pixels from pixel array 105 to be read out. All pixels in a row are turned out simultaneously and read in parallel by column readout circuitry 115. The pixels in a common row are selected and activated by a row selector circuitry 120 in response to control signals from controller 135. It should be appreciated that the dimensions of each pixel, including the size, shape, and number of pixels in a given array are for illustrative purposes only and are not intended to be limiting in scope unless otherwise stated.

In an embodiment of CMOS image sensor 100, each pixel column 111 includes a CDS circuit. Such a circuit is described, for example, in "Review of CMOS Image Sensors" by M. Bigas et al, *Microelectr. J.* 37 (2006) 433-451, and references therein. The row selector circuitry 120 applies a transfer gate signal TX to the selected pixel row to activate the pixels in the selected row. In response to control signals from controller 135, column readout circuitry 115 reads pixel output signals from pixels in the selected row during an image data sampling period.

RTS noise results when transfer gate signal TX reaches column readout circuitry 115. Such RTS noise is referred to herein as column-wise RTS noise or biased RTS noise. Biased RTS noise is visible in dark or low-light settings as faint vertical white lines in an image corresponding to pixel columns with readout circuitry exhibiting RTS noise. As discussed below, a bitline connection switch 133 is between one respective pixel column 111 and column readout circuitry 115. Each bitline connection switch 133 has timing properties (shown in FIG. 4 hereof and associated text) such that transfer gate signal TX does not reach column readout circuitry 115, which results in reduced biased RTS noise.

A bitline switch controller 134 controls each bitline connection switches 133 with a control signal S1. Bitline switch controller 134 may include a microprocessor. Functions of bitline switch controller 134 may for example be incorporated into controller 135, row selector circuitry 120, or other parts of reduced RTS-noise CMOS image sensor 100.

Each pixel column 111 is electrically connected to a respective column readout circuit 116 of column readout circuitry 115. Column readout circuits 116 are, in turn, connected to a pixel output stage 125. The pixel output stage 125 converts the electrical charges readout by the column readout circuitry 115 into digital image samples. The samples are then processed at a processor 130 for generating a digital image output 140, which includes image artifacts resulting from biased RTS noise that are most visible in low-light imaging conditions.

Figure 2:
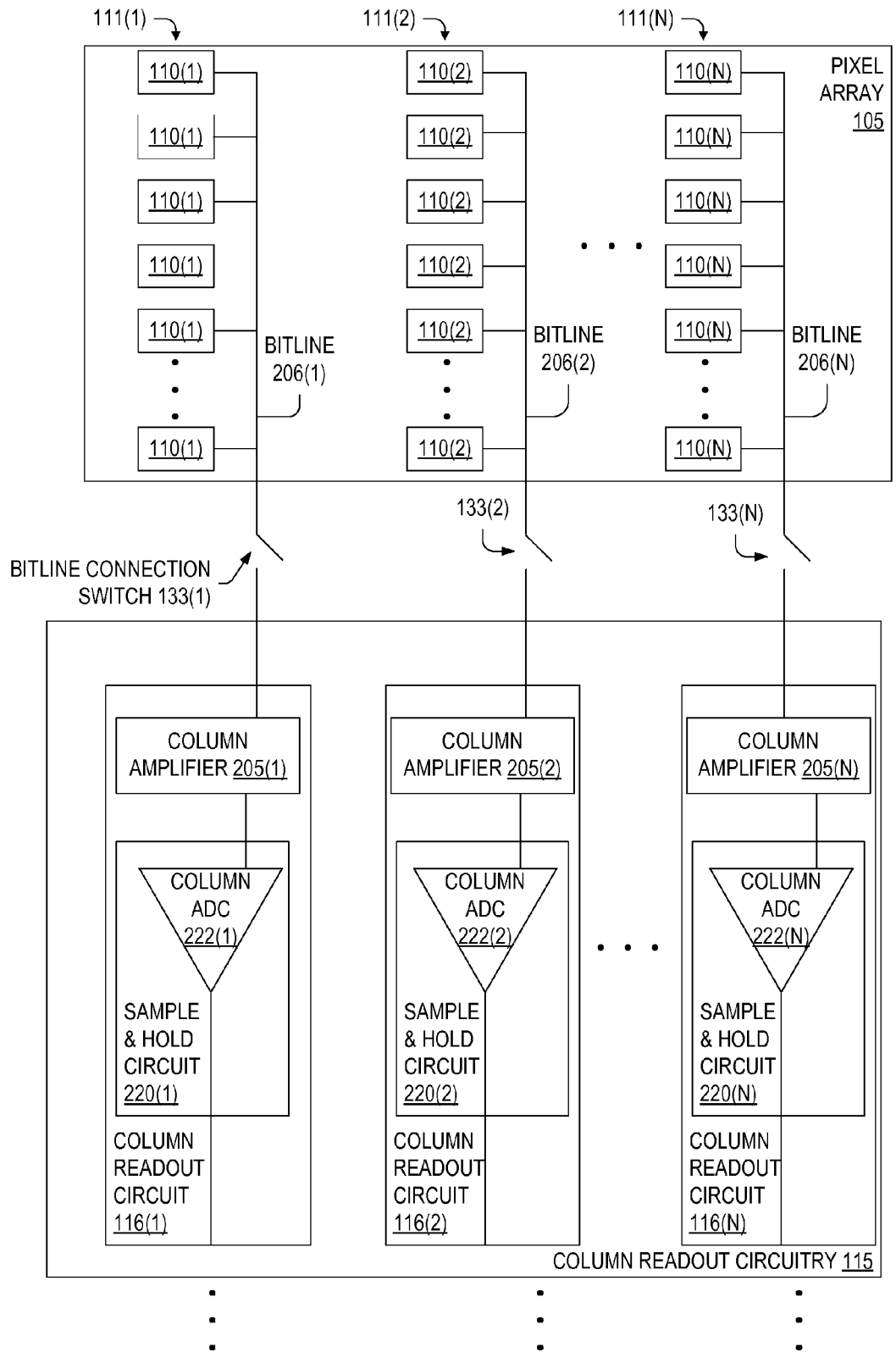
FIG. 2 shows, in further exemplary detail, the pixel array of the reduced RTS-noise CMOS image sensor of FIG. 1 and its column readout circuitry, in an embodiment.

FIG. 2 shows pixel array 105 and column readout circuitry 115 in further exemplary detail. Pixel array 105 includes pixels 110 arranged in N pixel columns 111(1) through 111(N). Column readout circuitry 115 includes column readout circuits 116(1) through 116(N) that are each connected to one respective pixel column 111(1) through 111(N). Column readout circuits 116(1) through 116(N) include respective column amplifiers 205(1) through 205(N) for amplifying respective electrical signals from pixels 110(1) through 110(N) in bitlines 206(1) through 206(N). Column readout circuits 116 also include respective sample-and-hold circuits 220(1) through 220(N) for reading out the amplified charges. Each sample-and-hold circuit 220 may include a column analog-to-digital converter (ADC) 222 and be capable of correlated double sampling. Bitlines 206, also referred to as "column lines," are conducting lines to which all of the pixels of a given column are connected and from which a signal output by each pixel is read. A bitline connection switch 133 between each respective pixel column 111 and its respective column readout circuit 116 selectively connects each bitline 206 to its respective column readout circuit 116.

Figure 3:
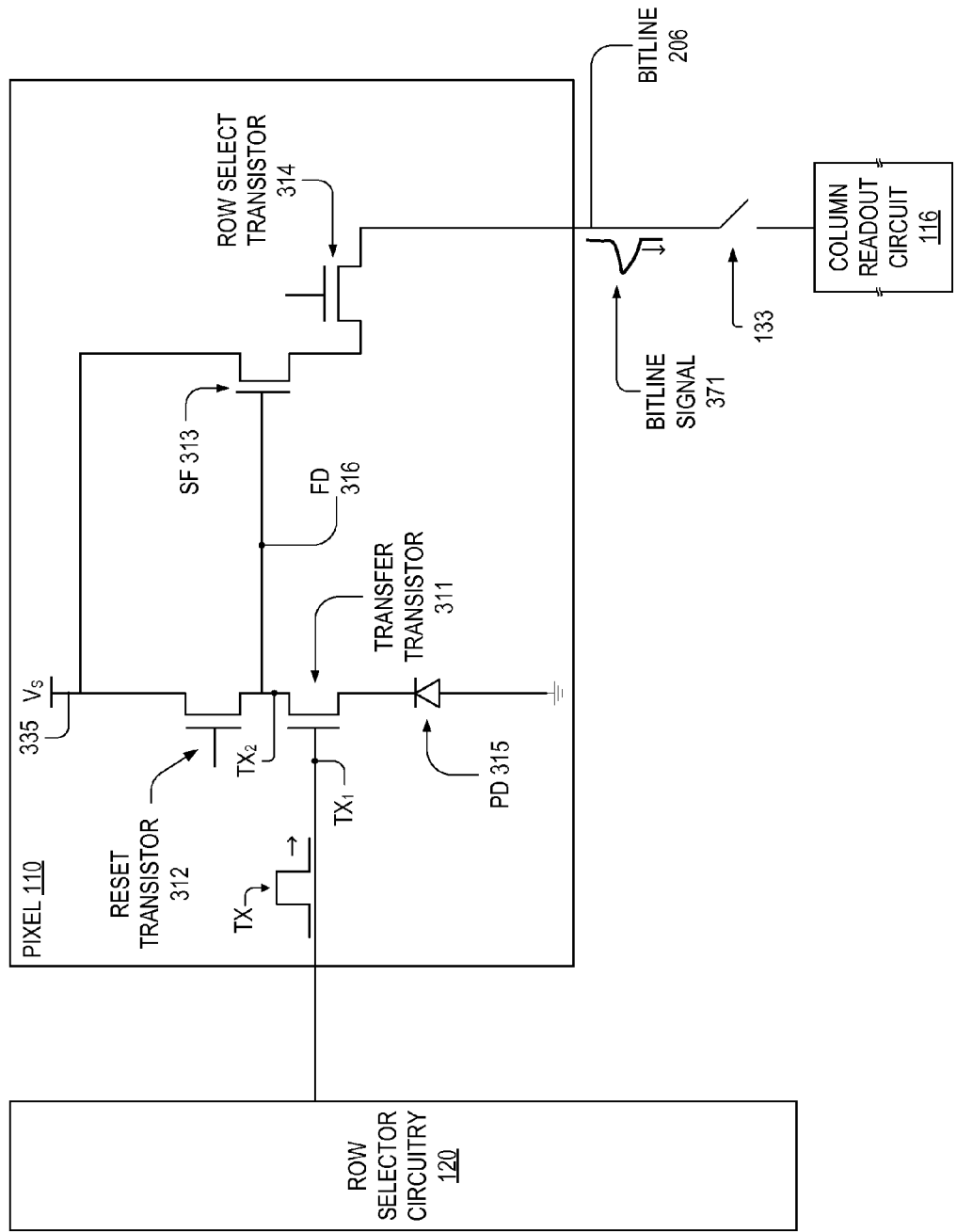
FIG. 3 is a circuit diagram of components within a pixel of the reduced RTS-noise CMOS image sensor of FIG. 1, in an embodiment.

A typical pixel 110 may employ a photodetector followed by a four-transistor ("4T") configuration as shown in FIG. 3. Pixel 110 includes a photodiode 315 followed by a transfer transistor 311, a reset transistor 312, a source follower transistor 313, and a row-select transistor 314. The photodetector 315 converts incident light thereon into an electrical charge. The electrical charge is received by a floating diffusion region 316 through the transfer transistor 311 when the transfer transistor 311 is activated by the transfer gate control signal TX. The reset transistor 312 is connected between the floating diffusion region 316 and a supply voltage line 335. A reset control signal "RST" is used to activate the reset transistor 312 for resetting the floating diffusion region 316 to the supply voltage $V_s$ at supply voltage line 335 prior to transferring the electrical charge from photodiode 315. Instead of a 4T configuration of FIG. 3, pixel 110 may employ a different transistor configuration such as three-transistor, five-transistor, or six-transistor without departing from the scope hereof.

The source follower transistor 313 is connected to the floating diffusion region 316 between the supply voltage line 335 and the row-select transistor 314. The source follower transistor 313 converts the electrical charge stored at the floating diffusion region 316 into a bitline signal 371. The row-select transistor 314 is controlled by a row select signal "RS" for selectively connecting the source follower transistor 313 and its bitline signal 371 into bitline 206, which connects to one column readout circuit 116 included in column readout circuitry 115.

In an imaging scenario where photodiode 315 receives no incident light, bitline signal 371 is a distorted version of transfer gate signal TX. Transfer gate signal TX may be distorted by features of circuit elements of pixel 110, such as parasitic capacitance $C_{TX}$ between points $TX_1$ and $TX_2$ (FIG. 3) of transfer transistor 311. If bitline connection switch 133 is closed when bitline signal 371 reaches it, bitline signal 371 "leaks" into column readout circuit 116 and one ADC 222 therein. ADC 222 includes a device trap. The increased voltage due to bitline signal 371 increases the device trap's electrostatic potential, which increases its likelihood of capturing an electron, and hence results in RTS noise from column ADC 222.

FIG. 4 is a timing diagram 400 illustrating CDS operation of one column readout circuit 116 of reduced RTS-noise CMOS image sensor 100 in a dark environment, such that no ambient light is incident thereon. Timing diagram 400 illustrates CDS over a CDS period 490, which includes a reference sample period 404 and an image data sample period 406 shown by a sample timing 402. Sample periods 404 and 406 correspond to measurements of a black reference value and an image data value respectively. Transfer gate signal TX and bitline signal 371 occur between adjacent sample periods 404 and 406, where reference sample period 404 precedes image data sample period 406. Switch timing 433 represents control signal S1 and illustrates the timing of bitline connection switch 133.

Row-select transistor timing 414 illustrates the state of row select transistor 314, FIG. 3. Row select transistor 314 is closed during correlated double sampling period 490. Row-select transistor timing 414 corresponds to a row-select transistor timing described, for example, in U.S. Pat. No. 8,294,077 to Mao et al., which lacks bitline connection switch 133. Since row select transistor 314 is on when bitline signal 371 is non-zero, bitline signal 371 reaches column readout circuit 116 and results in biased RTS noise. Bitline connection switch 133 with switch timing 433 removes such biased RTS noise by preventing bitline signal 371 from reaching column readout circuit 116. As a result, only unbiased RTS noise remains.

In timing diagram 400, transfer gate signal TX is on between times $t_2$ and $t_3$ and bitline signal 371 is non-zero between times between times $t_2$ and $t_4$. Transfer gate signal TX closes transfer transistor 311 such that charge accumulated in photodiode 315 moves toward floating diffusion 316. Bitline connection switch 133 is closed during CDS period 490 except during a duration $T_{51}$ between times $t_1$ and $t_5$. Time duration $T_{21}=t_2-t_1$ may be considered a setup time for bitline connection switch 133 such that bitline connection switch 133 is in a stable and unchanging open state when bitline signal 371 reaches it, which prevents bitline signal 371 from reaching column readout circuit 116. Time duration $T_{21}$ may equal zero without departing from the scope hereof. Time duration $T_{54}=t_5-t_4$ may be considered as a hold time for bitline connection switch 133 such that bitline connection switch 133 in a stable and unchanging closed (transmitting) state when bitline signal 371 returns to zero at time $t_4$. Time duration $T_{54}$ may equal zero without departing from the scope hereof.

Transfer gate signal TX and bitline signal 371 are non-zero for durations $T_{32}$ and $T_{42}$, respectively, where $T_{32}=t_3-t_2$ and $T_{42}=t_4-t_2$. Duration $T_{43}$ is determined by intrinsic capacitance $C_{FD}$ of floating diffusion region 316, parasitic capacitance $C_{TX}$ and RC time constant T of the source-follower and bitline circuit. Bitline signal 371 has a floating diffusion voltage $V_{FD}$ shown in Eq. 1.

$$V_{FD}(t) = \begin{cases} \Delta V'(1 - e^{-(t-t_2)/\tau}), & t_2 \le t \le t_3 \\ \Delta V' e^{-(t-t_3)/\tau}, & t_3 \le t \le t_4 \end{cases}, \quad (1)$$

In Eq. 1, $$\Delta V' = \Delta V \frac{C_{TX}}{C_{FD}}.$$

At time $t=t_4$, bitline signal 371 returns to a voltage $V_{FD}(t_4)=\Delta V'/\alpha$, where constant $\alpha$ is positive. Setting $\Delta T'/\alpha$ equal to $V_{FD}(t_4)$ according to Eq. (1) shows that $T_{43}=\tau \ln \alpha$. Constant $\alpha$ may be sufficiently large such that $V_{FD}(t_4)$ is negligible (effectively zero) compared to other measurable quantities such as $\Delta V'$.

Biased RTS noise may cause more artifacts in a resultant image since it changes the mean value of a histogram of pixel values, such that the histogram is skewed toward pixel values that exceed the median pixel value. By contrast, unbiased RTS noise manifests as a histogram that is symmetric about its mean pixel value, making image artifacts less visible. Biased RTS noise results in a statistically unbalanced number of white and black dots in an image while, unbiased RTS noise results in a statistically balance number of white and black dots. All other factors being equal, unbiased RTS noise results in less visible image artifacts than does biased RTS noise.

FIG. 5 is a flowchart illustrating a method 500 for reducing RTS noise in a CMOS image sensor. In step 502, method 500 opens, at a first instant, a bitline connection switch of a bitline selectively connecting a pixel and a readout circuit. The first instant occurs after a CDS reference sample ends and before a second instant when a bitline signal switches on. In an example of step 502, bitline connection switch 133 is opened at time $t_1$, which occurs after time $t_0$ and before time $t_2$ when transfer gate signal TX begins, as shown in FIG. 4. Transfer gate signal TX ends at a third instant occurring at time $t_3$.

In step 504, method 500 closes, at a fifth instant, the bitline connection switch. The fifth instant occurs after a fourth instant when the bitline signal ends and before a sixth instant when a CDS imaging data sample begins. In an example of step 504, bitline connection switch 133 is closed at time $t_5$, which occurs after time $t_4$ and before time $t_6$.

Method 500 maintains the bitline connection switch in a closed state at all times during a CDS period except at times between the first instance and the fifth instance. For example, bitline connection switch 133 is maintained at a closed state (a closed-circuited state) at all times during CDS period 490 except at times between time $t_1$ and time $t_5$.

Method 500 also maintains the bitline connection switch in an open state (an open-circuited state) at all times between the first instance and the fifth instance. For example, bitline connection switch 133 is maintained an open state at all times between time $t_1$ and time $t_5$.

In an embodiment of method 500, steps 502 and 504 are the only times bitline connection switch are opened and closed, respectively, during a CDS period, as FIG. 4 illustrates.

Combinations of Features.

Features described above as well as those claimed below may be combined in various ways without departing from the scope hereof. The following examples illustrate some possible, non-limiting combinations:

(A1) A reduced random telegraph signal (RTS)-noise CMOS image sensor includes a pixel and a correlated double sampling (CDS) circuit electrically connected to the pixel. The CDS circuit is characterized by a CDS period that includes a reference sample period and an image data sample period. The image sensor also includes a bitline, a bitline connection switch between the pixel and a readout circuit connected to the pixel, and a bitline switch controller. The bitline transmits a transfer gate signal as a bitline signal having a non-zero value during a first time period entirely between the reference sample period and the image data sample period. The bitline switch controller is electrically connected to and configured to control the bitline connection switch such that the bitline connection switch is closed during the entire CDS period except for a single continuous open period that includes the first time period.

(A2) In the image sensor denoted as (A1), the bitline connection switch may have a switch timing that has exactly two transitions per CDS period.

(A3) In either or both of the image sensors denoted as (A1) and (A2), the bitline signal may have a duration that exceeds a duration of the transfer gate signal.

(A4) In any of the image sensors denoted as (A1) through (A3), the transfer gate signal may have a duration entirely between the reference sample and the image data sample.

(A5) In any of the image sensors denoted as (A1) through (A4), the pixel may be part of a one of a plurality of pixel columns that form a pixel array, and the readout circuit may be a column readout circuit electrically connected to the one of a plurality of pixel columns.

(B1) A method for reducing RTS noise in a CMOS image sensor includes opening, at a first instant, a bitline connection switch of a bitline selectively connecting a pixel and a readout circuit. The first instant occurs after a correlated double sampling (CDS) reference sample ends before a second instant when a bitline signal switches on. The method also includes closing, at a fifth instant, the bitline connection switch. The fifth instant occurs after a fourth instant when the bitline signal ends and before a sixth instant when a CDS imaging data sample begins.

(B2) The method denoted as (B1) may also include a step of maintaining the bitline connection switch in a closed state at all times during a CDS period except at times between the first instant and the fifth instant.

(B3) Either or both methods denoted as (B1) and (B2) may also include maintaining the bitline connection switch in an open state at all times between the first instant and the fifth instant.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A reduced random telegraph signal (RTS)-noise CMOS image sensor comprising:
   a pixel;
   a correlated double sampling (CDS) circuit electrically connected to the pixel, and characterized by a CDS period that includes a reference sample period and an image data sample period;
   a bitline that transmits a transfer gate signal as a bitline signal having a non-zero value during a first time period entirely between the reference sample period and the image data sample period;
   a bitline connection switch between the pixel and a readout circuit connected to the pixel; and
   a bitline switch controller electrically connected to and configured to control the bitline connection switch such that the bitline connection switch is closed during the entire CDS period except for a single continuous open period that includes the first time period.

2. The image sensor of claim 1, the bitline connection switch having a switch timing that has exactly two transitions per CDS period.

3. The image sensor of claim 1, the bitline signal having a duration that exceeds a duration of the transfer gate signal.

4. The image sensor of claim 1, the transfer gate signal having a duration entirely between the reference sample and the image data sample.

5. The image sensor of claim 1, the pixel being part of a one of a plurality of pixel columns that form a pixel array, the readout circuit being a column readout circuit electrically connected to the one of a plurality of pixel columns.

6. A method for reducing RTS noise in a CMOS image sensor comprising:
   opening, at a first instant, a bitline connection switch of a bitline selectively connecting a pixel and a readout circuit, the first instant occurring after a correlated double sampling (CDS) reference sample ends before a second instant when a bitline signal switches on; and
   closing, at a fifth instant, the bitline connection switch, the fifth instant occurring after a fourth instant when the bitline signal ends and before a sixth instant when a CDS imaging data sample begins.

7. The method of claim 6, further comprising:
   maintaining the bitline connection switch in a closed state at all times during a CDS period except at times between the first instant and the fifth instant.

8. The method of claim 6, further comprising:
   maintaining the bitline connection switch in an open state at all times between the first instant and the fifth instant.

* * * * *